CLUTCH DRUM ASSEMBLY FOR AUTOMATIC POWER TRANSMISSION

FIELD OF THE INVENTION

The present invention relates in general to an automatic power transmission, more particularly to a clutch mechanism of the transmission which functions to selectively connect and disconnect a driving and a driven element of the transmission. More specifically, the present invention is concerned with a high-and-reverse clutch of the type having a clutch drum which is selectively tightened and released by a fluid operated brake band wrapping the same.

SUMMARY OF THE INVENTION

It is an object of the present invention to provide an automatic power transmission having a clutch mechanism in which better lubrication between a clutch drum assembly and a brake band wrapping the assembly is achieved.

It is another object of the present invention to provide a low cost but efficient and light weight clutch drum assembly of a clutch for the automatic power transmission.

SUMMARY OF THE DRAWINGS

Other objects and advantages of the present invention will become clear from the following description when taken in conjunction with the accompanying drawings in which.

DESCRIPTION OF THE PREFERRED EMBODIMENTS

Prior to describing the detailed construction and configuration of the clutch mechanism of the invention, explanation of overall construction of the transmission in which the clutch mechanism is employed will be made with reference to FIGS. 1(A) and 1(B) in order to clarify the invention.

Figure 1:
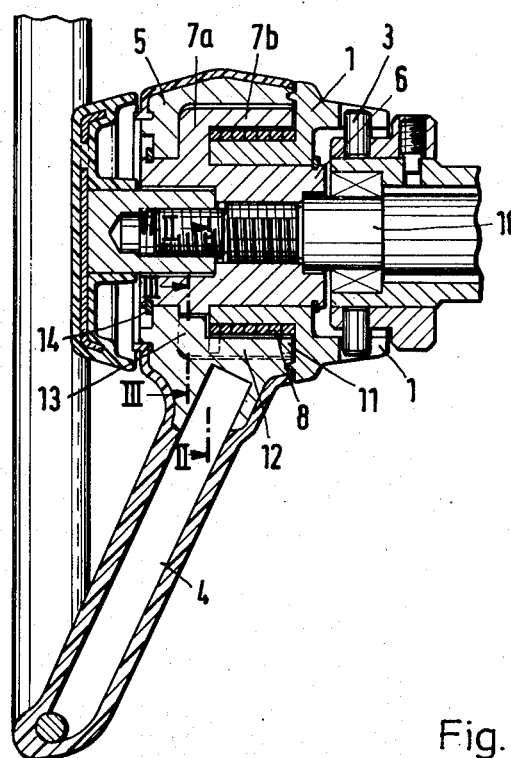
FIGS. 1(A) and 1(B) are sectional views of a transversely mounted type automatic power transmission in combination with a final drive unit, to which an improved clutch mechanism according to the invention is applied, the final drive unit being shown moved from its proper position for clearness of the drawing.
Figure 1A:
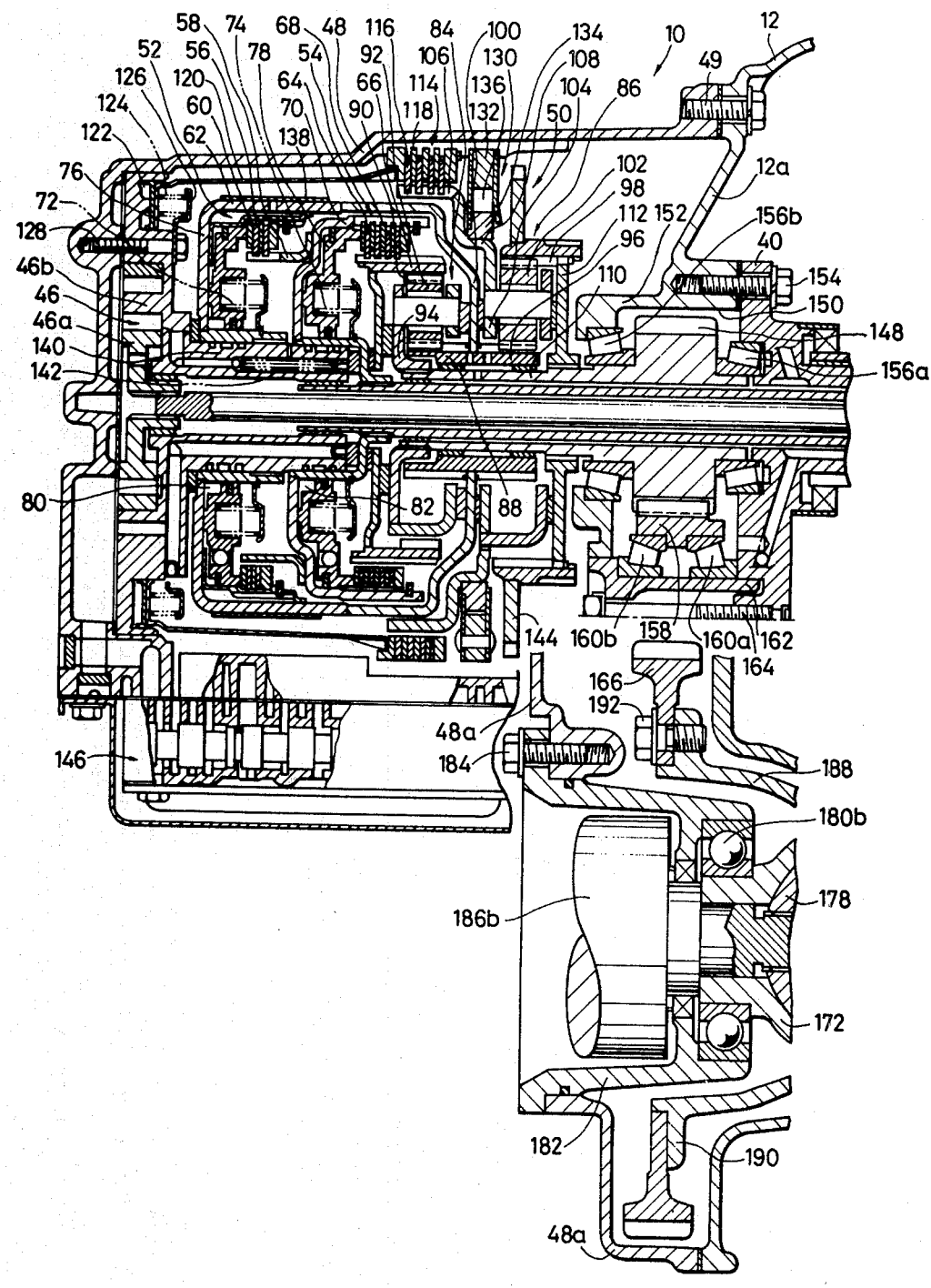
Figure 1B:
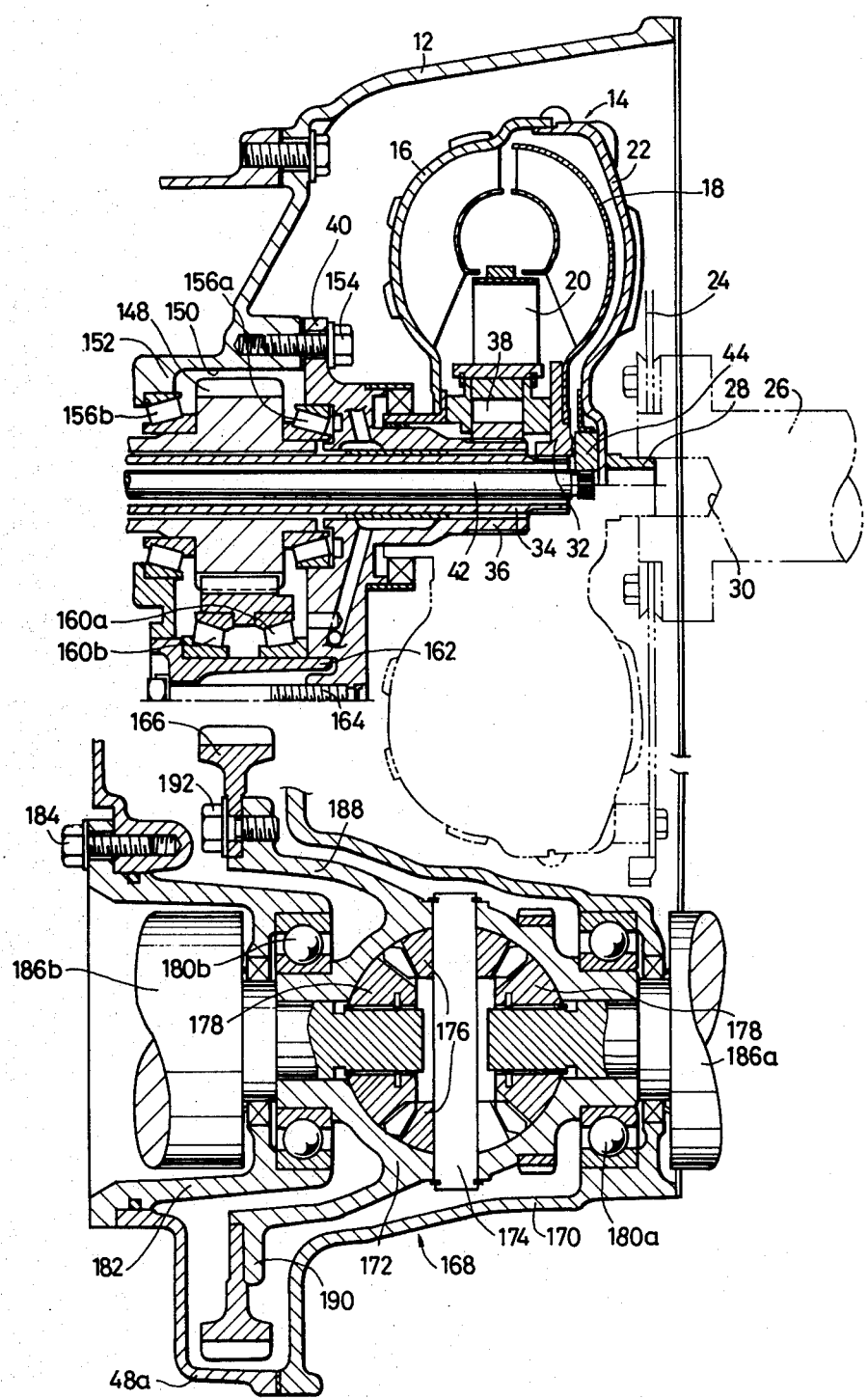
Figure 3:
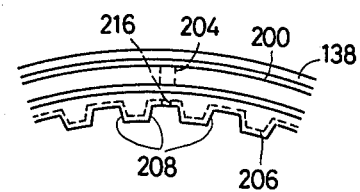
Figure 2:
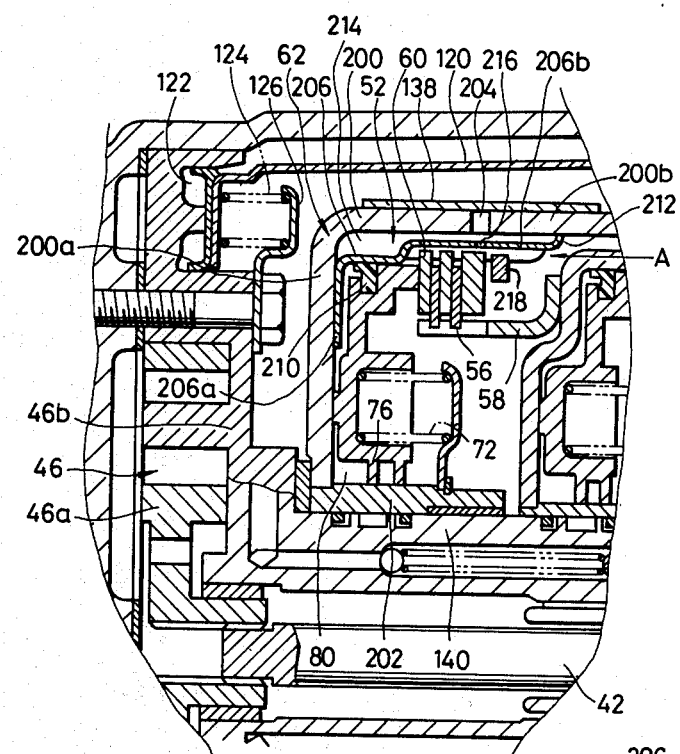

Referring to FIG. 1 of the drawings, there is shown a transversely mounted type automatic power transmission 10 in combination with a final drive unit 168.

The transmission 10 comprises a converter housing 12 within which the torque converter assembly 14 is housed. The torque converter assembly 14 comprises a pump impeller 16, a turbine runner 18, and a stator 20 as is well known in the art. The pump impeller 16 is connected via a converter cover 22 and a drive plate 24 to a crankshaft 26 of a power plant such as an internal combustion engine (not shown) and is rotatable with crankshaft 26 about an axis which is aligned with the axis of rotation of the crankshaft 26. Denoted by 28 is a pilot element which is secured to a central portion of the converter cover 22 and is received in a central bore 30 of the crankshaft 26, as shown. The turbine runner 18 is mounted on a hub 32 which in turn is keyed or splined to a transmission hollow input shaft 34 which has a center axis aligned with the axis of rotation of the engine crankshaft 26. The stator 20 is positioned between the pump impeller 16 and the turbine runner 18 and is mounted on a stator support hollow shaft 36 through a torque converter one-way clutch assembly 38. The stator support hollow shaft 36 has the transmission hollow input shaft 34 axially passed therethrough in substantially coaxial relationship and is fixedly but detachably connected through a flange portion 40 thereof to a base wall 12a of the converter housing 12, as will be well understood hereinlater. The stator 20 is permitted to rotate about the center axis of the input shaft 34 in the same direction as the direction of the pump impeller 16 and accordingly as the direction of rotation of the engine crankshaft 26. An oil pump driving shaft 42 is rotatably and concentrically received in the input shaft 34 and has a right end to which a hub 44 of the converter cover 22 is splined or keyed. As will be understood hereinlater, a left end of the oil pump driving shaft 42 is keyed with a drive gear 46a of a transmission oil pump assembly 46 which has an oil pump body 46b bolted or otherwise secured to a stationary wall structure of a later-mentioned gear unit housing 48 of the transmission 10.

When the engine is in operation, the driving power produced by the engine is delivered from the engine crankshaft 26 to the pump impeller 16 through the converter cover 22 and is transmitted from the pump impeller 16 to the input shaft 34 through the turbine runner 18 with a torque multiplied by means of the stator 20 at a ratio which is variable with the ratio between the revolution speed of the engine crankshaft 26 and that of the input shaft 34. The pump impeller 16 thus drives not only the turbine runner 18 but also the transmission oil pump assembly 46 through the oil pump driving shaft 42 so that the oil pump assembly 46 delivers oil under pressure which is also variable with the revolution speed of the crankshaft 26 of the engine.

Within the gear unit casing 48 connected via bolts 49 to the converter housing 12 is positioned a gear unit 50 of the transmission 10. The unit 50 herein shown is arranged between the torque converter assembly 14 and the oil pump assembly 46. The gear unit 50 comprises first and second or high-and-reverse and forward drive clutches 52 and 54 which are positioned in a manner that the high-and-reverse clutch 52 is located between the oil pump assembly 46 and the forward drive clutch 54. The high-and-reverse clutch 52 comprises a plurality of plates 56 keyed or splined at their inner peripheral edges to a clutch hub 58 and plates 60 keyed or splined at their outer peripheral edges to a first clutch drum assembly 62. Likewise, the forward drive clutch 54 comprises a plurality of plates 64 keyed or splined at their inner peripheral edges to a clutch hub 66 and plates 68 keyed or splined at their outer peripheral edges to a second clutch drum 70. The clutch hub 58 for the high-and-reverse clutch 52 and the second clutch drum 70 for the forward drive clutch 54 are secured to each other and rotatable with the input shaft 34 with the second clutch drum 70 keyed or splined at its inner peripheral portion to a left end portion of the input shaft 34. The plate 56 of the high-and-reverse clutch 52 and the plates 68 of the forward drive clutch 54 thus serve as driving friction elements and, accordingly, the plates 60 of the high-and-reverse clutch 52 and the plates 64 of the forward drive clutch 54 serve as driven friction elements in the clutches 52 and 54, respectively. Clutch pistons 76 and 78 are respectively incorporated with the high-and-reverse clutch 52 and the forward drive clutch 54 respectively for bringing the clutches 52 and 54 into engagement when moved by a fluid fed into respective fluid chambers 80 and 82 which are formed between the clutch piston 76 and the first clutch drum assembly 62 and between the clutch piston 78 and the second clutch drum 70, respectively, as shown. Return springs 72 and 74 are respectively incorporated with the high-and-reverse clutch 52 and the forward drive clutch 54 to urge the pistons 76 and 78 in a direction to disengage the clutches 52 and 54, respectively.

The gear unit 50 further comprises first and second planetary gear assemblies 84 and 86 which are arranged at the right of the forward drive clutch 54 in the drawing. The first planetary gear assembly 84 comprises an externally toothed sun gear 88 and an internally toothed ring gear 90 which have a common axis of rotation aligned with the center axis of the input shaft 34. The ring gear 90 is formed on the clutch hub 66 for the forward drive clutch 54. The first planetary gear assembly 84 further comprises at least two planet pinions 92 each of which is in mesh with the sun and ring gears 88 and 90 and is rotatable about an axis around the common axis of rotation of the sun and ring gears 88 and 90. The planet pinions 92 of the first planetary gear assembly 84 are journaled on shafts of a pinion carrier 94. The second planetary gear assembly 86 is constructed similarly to the first planetary gear assembly 84 and thus comprises an externally toothed sun gear 96 and an internally toothed ring gear 98 which have a common axis of rotation aligned with the center axis of the transmission hollow input shaft 34. The sun gear 96 is integral with the sun gear 88 of the first planetary gear assembly 84. The united sun gears 88 and 96 of the first and second planetary gear assemblies 84 and 86, respectively, are jointly splined to a connecting shell 100 which encloses the forward drive clutch 54 and the first planetary gear assembly 84 and is securely connected to the first clutch drum assembly 62 for the high-and-reverse clutch 52. The second planetary gear assembly 86 further comprises at least two planet pinions 102 each of which is in mesh with the sun and ring gears 96 and 98 and is rotatable about an axis around the common axis of rotation of the sun and ring gears 96 and 98. The planet pinions 102 of the second planetary gear assembly 86 are rotatably supported by a pinion carrier 104 having a drum portion 106 which leftwardly extends to enclose in part the connecting shell 100 therein, as shown. By the reason which will become clear from the latter, the drum portion 106 of the pinion carrier 104 has a circular stop portion 108. The respective sun gears 88 and 96 of the first and second planetary gear assemblies 84 and 86 are formed with center bores through which a transmission hollow output shaft 110 having a center axis aligned with the center axis of the input shaft 34 is passed and axially extends toward the torque converter assembly 14. The output shaft 110 thus coaxially receives therein the input shaft 34, as shown. The output shaft 110 has a left end to which the pinion carrier 94 for the first planetary gear assembly 84 is splined at its inner peripheral edge and has an intermediate portion to which the ring gear 98 for the second planetary gear assembly 86 is connected through a generally disc shaped connecting member 112 which is keyed or splined at its inner peripheral edge to the intermediate portion of the output shaft 110 and at its outer peripheral edge to the ring gear 98. Concentrically mounted around the drum portion 106 of the pinion carrier 104 for the second planetary gear assembly 86 is a low-and-reverse brake 114. This brake 114 comprises a plurality of plates 116 keyed or splined at their inner peripheral edges to the drum portion 106 of the second planetary gear assembly 86, and a plurality of plates 118 which are keyed or splined at their outer peripheral edges to an intermediate portion of the inner wall of the gear unit housing 48. The low-and-reverse brake 114 further has a drum shaped piston 120 which is concentrically mounted around the first clutch drum assembly 62 for the high-and-reverse clutch 52 and engages at its right end to the leftmost member of the plates 116 and 118. The left end portion of the piston 120 is sealingly disposed in a fluid chamber 122 into which a fluid under pressure is fed to move the piston 120 rightwardly urging the plates 116 and 118 of the brake unit 114 to be engaged with one another against a biasing force developed by return springs 124 which are interposed between the left end portion of the piston 120 and a spring retainer 126 fixed to the oil pump body 46b via bolts 128. As shown, the fluid chamber 122 is formed in the oil pump body 46b. The low-and-reverse brake 114 is paralleled in effect by a transmission one-way clutch 130 which is positioned about the before-mentioned drum portion 106 for the second planetary gear assembly 86 and comprises a stationary outer race member 132, a rotatable inner race member 134 and a series of spring loaded rollers 136 disposed between the outer and inner race members 132 and 134. The stationary outer race member 132 is splined to the inner wall of the gear unit housing 48. On the other hand, the rotatable inner race member 134 is securely disposed on the before-mentioned circular step portion 108 of the drum portion 106 for the second planetary gear assembly 86. The rollers 136 are arranged in a manner to be caused to stick to the outer and inner race members 132 and 134 and thereby lock up the rotatable inner race member 134 to the stationary outer race member 132 when the inner race member 134 is urged to turn about the center axis of the output shaft 110 in a direction opposite to the direction of rotation of the engine crankshaft 26, viz., to the direction of rotation of the output shaft 110 to produce a forward drive mode of an automotive vehicle. The gear unit 50 of the transmission 10 further comprises a brake band 138 which wrappes the cylindrical outer surface of the first clutch drum assembly 62 for the high-and-reverse clutch 52. Although not shown, the brake band 138 is anchored at one end to the gear unit housing 48 and is at the other end connected to or engaged by a fluid operated band servo unit (not shown). Although, not shown in the drawing, a transmission governor assembly indirectly driven by the output shaft 110 is arranged in the gear unit housing 48 in the vicinity of the ring gear 98 of the second planetary gear assembly 86. The body 46b of the before-mentioned oil pump assembly 46 has a rightwardly extending sleeve portion 140 in which a fluid passage 142 for lubrication fluid for the clutch assemblies 52 and 54 is formed. Indicated by numeral 144 is a parking gear which is secured on the ring gear 98 for the second planetary gear assembly 86, forming part of a parking lock assembly to lock the output shaft 110 by the aid of a parking pawl (not shown) meshing with the parking gear 144 during parking of the vehicle. Indicated generally by numeral 146 is a hydraulic control valve unit by which the gear unit 50 is controlled.

The output shaft 110 is integrally formed at its right section with an output gear 148 which has an axis of rotation aligned with the center axis of the output shaft 110. As will be understood from the drawing, the output gear 148 is situated within a chamber 150 which is defined by not only an extension 152 of the base wall 12a of the cover housing 12 but also the flange portion 40 of the stator support hollow shaft 36. The flange portion 40 is detachably connected to the base wall 12a by means of bolts 154. As shown, the extension 152 protrudes into the interior of the gear unit housing 48 and has as its leading end portion a bearing opening (no numeral) within which is situated a tapered roller bearing 156b. The flange portion 40 of the stator support hollow shaft 36 is formed at a portion exposed to the chamber 150 of the output gear 148 with a blind bore or bearing opening (no numeral) within which is situated another tapered roller bearing 156a. Inner races of these bearings 156a and 156b are mounted on the transmission output shaft 110 in a manner to put the output gear 148 therebetween. Meshing with the output gear 148 is an idler gear 158 which is supported by a pair of tapered roller bearings 160a and 160b. Inner races of these bearings 160a and 160b are coaxially mounted on a sleeve shaft 162 which is connected to the flange portion 40 of the before-mentioned stator support hollow shaft 36 by means of a bolt 164 passing through the sleeve shaft 162 in a manner that the axis of the idler gear 158 is parallel with the axis of the output gear 148. The idler gear 158 is meshed with an externally toothed ring gear 166 forming part of the final drive unit 168.

The final drive unit 168 is positioned on a lateral side of the transmission 10 and comprises a housing 170 integral with the converter housing 12 and housing therein a differential case 172, a differential pinion shaft 174 passing through the case 172, differential pinions 176 rotatably disposed about the pinion shaft 174, and differential side gears 178 each meshing with both the differential pinions 176 as is known in the art. The case 172 has both lateral end portions on which differential side bearings 180a and 180b are mounted. The right hand bearing 180a is securely received in the bore of the housing 170, while the lefthand bearing 180b is received in a drum-shaped retainer 182 which is detachably held in an opening (no numeral) formed in a laterally projected portion 48a of the gear unit housing 48. Denoted by numeral 184 is a bolt for connecting the retainer 182 to the portion 48a of the gear unit housing 48. Extending away from the differential side gears 178 are respective axle shafts 186a and 186b. The case 172 is integrally formed with a connecting shell portion 188 which extends leftwardly in this drawing and spacedly encloses in part the drum-shaped retainer 182. The connecting shell portion 188 has at the leading end thereof a flange 190 to which the above-mentioned externally toothed ring gear 166 is fixed by means of bolts 192.

With this, the power train between the internal combustion engine and the driving road wheels connected to the axle shaft 186a and 186b is made up.

The transmission 10 incorporating with the final drive unit 168 operates as follows:

TABLE 1

| Range | | High-and-Reverse (52) | Forward drive (54) | Low & reverse brake (114) | One way clutch (130) | Brake band (138) Applied | Brake band (138) Released |
|---|---|---|---|---|---|---|---|
| "P" | | | | O | | | |
| "R" | | O | | O | | | O |
| "N" | | | | | | | |
| Drive | "D₁" | | O | | O | | |
| | "D₂" | | O | | | O | |
| | "D₃" | O | O | | | (O) | O |
| | "2" | | O | | | O | |
| "1" | 2 | | O | | | O | |
| | 1 | | O | O | | | |

The high-and-reverse and forward drive clutches 52 and 54, low-and-reverse brake 114, one-way clutch 130 and brake band 138 of the transmission mechanism or the gear unit 50 having the construction hereinbefore described are operated in accordance with shedules indicated in Table 1.

In Table 1, the sign "O" indicates that for each of the high-and-reverse, forward-drive and one-way clutches 52, 54 and 130 the clutch in question is in a coupled condition and for the low-and-reverse brake 114 the brake is in a condition applied. As to the brake band 138, the sign "O" in the column under "Applied" indicates that the brake band 138 is actuated to lock up the first clutch drum assembly 62 and the sign "O" in the column under "Released" indicates that the brake band 138 is released from the first clutch drum assembly 62. The sign "O" enclosed in the parentheses means that there is a fluid pressure developed in the brake-apply chamber in the servo unit (not shown) but the brake band 138 is released from the first clutch drum assembly 62 with a fluid pressure also developed in the brake-release chamber of the servo unit.

The parking, reverse drive and neutral gear ranges and the automatic forward drive and manual second and first forward drive ranges as indicated in the leftmost column of Table are selectively established in transmission mechanism by manipulating a manual selector lever (not shown) which has positioned "P", "R", "N", "D", "2" and "1" respectively corresponding to the above-mentioned gear ranges.

When now the selector lever is in the parking range "P" or the neutral range "N", both of the high-and-reverse and forward drive clutches 52 and 54 are held in the uncoupled condition thereof so that the driving connection between the input and output shafts 34 and 110 is interrupted and as a consequence the output shaft 110 is maintained at rest even though the engine is in operation delivering its power output from the crankshaft 26. Under these conditions, either the parking range or the neutral range is established in the transmission mechanism depending upon whether the selector lever is held in the parking range "P" or in the neutral range "N". If the selector lever is in the parking range "P", the low-and-reverse brake 114 is held in the condition applied so that the drum portion 106 and accordingly the pinion carrier 104 of the second planetary gear assembly 86 are locked to the gear unit housing 48. During parking of the vehicle, the parking gear 144 mounted on the ring gear 98 for the second planetary gear assembly 86 is captured by the parking pawl (not shown) of the before-mentioned parking lock assembly so that the output shaft 110 is locked up to the gear unit housing 48.

When the manual selector lever is moved into the automatic forward drive range "D" with the engine operating, the forward drive clutch 54 is caused to couple. The power output delivered from the crankshaft 26 of the engine to the input shaft 34 through the torque converter assembly 14 is transmitted through the forward drive clutch 54 and the clutch hub 66 to the ring gear 90 of the first planetary gear assembly 84. The ring gear 90 is driven to rotate in the forward direction about the center axis of the output shaft 110 and thereby causes the sun gear 88 to rotate in the opposite direction about the center axis of the output shaft 110 through the planet pinions 92 each of which is rotated in the same direction as the ring gear 90 about its own axis of rotation. The sun gear 96 of the second planetary gear assembly 86, which is integral with the sun gear 88 of the first planetary gear assembly 84, is rotated in the opposite or reverse direction about the center axis of the output shaft 110 and causes the ring gear 98 of the second planetary gear assembly 86 to turn in the forward direction about the center axis of the output shaft 110. Under these conditions, the individual planet pinions 102 of the second planetary gear assembly 86 are caused to rotate in the forward direction about the respective axes of rotation thereof and therefore attempt to turn in the reverse direction about the center axis of the output shaft 110. The revolution of the pinion carrier 104 of the second planetary gear assembly 86 is, however, prohibited by the one-way clutch 130 connected to the pinion carrier 104, more specifically to the step portion 108 of the drum portion 106 with the result that the pinion carrier 104 is locked to the gear unit housing 48 and acts as reaction elements for the ring gear 98 which drives via the disc-shaped connecting member 112 the output shaft 110 to rotate in the forward direction about the center axis thereof. The output shaft 110 is connected to the pinion carrier 94 of the first planetary gear assembly 84 so that each of the planet pinions 92 is rotated about the center axis of the output shaft 110 in the same direction as the direction of rotation of the ring gear 90 of the first planetary gear assembly 84 but at a revolution speed which is lower with a certain ratio than the revolution speed of the ring gear 90 on which the planet pinions 92 are rolling, thereby creating the first forward speed or "low" gear ratio ($D_1$) in the transmission mechanism.

If the vehicle is thereafter sped up and the vehicle speed reaches a certain level, the band servo unit for the brake band 138 is actuated by a fluid distributed into the brake-apply fluid chamber of the servo unit and causes the brake band 138 to be tightened on the first clutch drum assembly 62 which is connected via the connecting shell 100 to the integral first and second sun gears 88 and 96 for the first and second planetary gear assemblies 84 and 86. The sun gear 88 of the first planetary gear assembly 84 now acts as a reaction element for the planet pinions 92 which are being driven to turn in the forward direction about the center axis of the output shaft 110 by the ring gear 90 rotating with the input shaft 34 through the forward drive clutch 54 which is kept coupled. The driving torque carried over to the ring gear 90 of the first planetary gear assembly 84 through the forward drive clutch 54 is therefore transmitted to the output shaft 110 by means of the planet pinions 92 and the associated pinion carrier 94. Under these conditions, the individual planet pinions 92 of the first planetary gear assembly 84 are caused to rotate in the forward direction about the respective axis of rotation thereof and thus roll on the ring gear 90 while rotating in the forward direction about the center axis of the output shaft 110. The output shaft 110 is thus rotated in the forward direction about the center axis thereof at a speed higher than that achieved under the first forward speed or "low" gear ratio ($D_1$) but lower with a certain ratio than the revolution speed of the ring gear 90 of the first planetary gear assembly 84, thereby producing the second forward speed or intermediate ratio ($D_2$) in the transmission mechanism. Under the second forward speed thus established, the output shaft 110 drives the ring gear 98 of the second planetary gear assembly 86 to rotate in the forward direction about the center axis of the output shaft 110 and thereby causes the planet pinions 102 to turn about the center axis of the output shaft 110 in the same direction as the direction of rotation of the ring gear 98. Thus, the pinion carrier 104 of the second planetary gear assembly 86 and accordingly the drum portion 106 are also rotated in the forward direction about the center axis of the output shaft 110 and cause the inner race member 134 of the transmission one-way clutch 103 to run idle within the outer race member 132 of the one-way clutch 130.

As the vehicle speed further increases, a fluid is distributed into the brake-release fluid chamber of the band servo unit for the brake band 138 and causes the brake band 138 to be released from the first clutch drum assembly 62 and, substantially at the same time, the high-and-reverse clutch 52 is actuated to couple. The power output delivered from the crankshaft 26 of the engine to the input shaft 34 is now transmitted on one hand to the integral first and second sun gears 88 and 96 of the first and second planetary gear assemblies 84 and 86 through the high-and-reverse clutch 52 and the first clutch drum assembly 62 released from the brake band 138 and on the other hand to the ring gear 90 of the first planetary gear assembly 84 by way of the forward drive clutch 54 and the clutch hub 66. It therefore follows that the sun gear 88 and the ring gear 90 for the first planetary gear assembly 84 are locked up so that the sun and ring gears 88 and 90 and the planet pinions 92 therebetween as well as the output shaft 110 connected to the planet pinion 92 by the pinion carrier 94 are driven to rotate as a single unit in the forward direction about the center axis of the output shaft 110. The output shaft 110 is thus rotated in the forward direction about the center axis thereof at a speed substantially equal to the revolution speed of the input shaft 34, thereby providing the third forward speed or "high" gear ratio ($D_3$) in the transmission mechanism. Under the third forward drive speed thus established, the input shaft 34 driven by the turbine runner 18 of the torque converter 14 is rotated at a speed substantially equal to the revolution speed of the engine crankshaft 26 driving the pump impeller 16 of the converter 14 and, as a consequence, there occurs no torque multiplication by the torque converter 14, which thus functions merely as a fluid coupling.

When the manual selector lever is moved into the reverse drive range "R". The high-and-reverse clutch 52 and the low-and-reverse brake 114 are actuated in the transmission mechanism. With the high-and-reverse clutch 52 thus engaged, the power output delivered from the crankshaft 26 of the engine to the input shaft 34 by way of the torque converter 14 is transmitted through the high-and-reverse clutch 52, first clutch drum assembly 62 and connecting shell 100 to the integral sun gears 88 and 96 of the first and second planetary gear assemblies 84 and 86, respectively, causing the sun gears 88 and 96 to rotate in the forward direction about the center axis of the output shaft 110. The low-and-reverse brake 114 is being actuated to lock the drum portion 106 and thus the pinion carrier 104 for the second planetary gear assembly 86 is held stationary with respect to the gear unit housing 48, with the result that the planet pinions 102 of the second planetary gear assembly 86 are driven by the sun gear 96 for rotation in the reverse direction about the center axis of the output shaft 110. This causes the output shaft 110 to rotate in the reverse direction about the center axis thereof at a speed which is lower with a certain ratio than the revolution speed of the sun gears 88 and 96 of the first and second planetary gear assemblies 84 and 86 and accordingly of the input shaft 34, establishing the reverse drive range "R" in the transmission mechanism.

When the selector lever is in the manual second forward drive range "2", the forward drive clutch 54 and the brake band 138 are actuated and, as a consequence the output shaft 110 is driven to rotate in the forward direction about the center axis thereof by means of the pinion carrier 94 of the first planetary gear assembly 84 as in the second forward speed ($D_2$) produced with the selector lever held in the automatic forward drive range "D".

Under the condition in which the selector lever is held in the manual first forward drive range position "1", either the low-and-reverse brake 114 or the brake band 138 as well as the forward drive clutch 54 is actuated to lock the pinion carrier 104 of the second planetary gear assembly 86 or the integral sun gears 88 and 96 of the first and second planetary gear assemblies 84 and 86 depending upon the vehicle speed. If the forward drive clutch 54 and the brake band 138 are actuated in this instance, the output shaft 110 is driven to rotate in the forward direction by the pinion carrier 94 of the first planetary gear assembly 84 as in the second forward speed ($D_2$) established with the selector lever held in the automatic forward drive range "D". If, on the other hand, the forward drive clutch 54 and the low-and-reverse brake 114 are actuated in the manual forward speed range, the output shaft 110 is driven to rotate in the forward direction about the center axis thereof by the ring gear 98 of the second planetary gear assembly 86 having the pinion carrier 104 held stationary with respect to the gear unit housing 48, as in the first forward speed ($D_1$) produced with the selector lever held in the automatic forward drive range "D". While the pinion carrier 104 is locked to the gear unit housing 48 by the action of the transmission one-way clutch 130 under the first forward speed produced in the automatic forward drive range, the pinion carrier 104 is locked to the gear unit housing 48 by means of the low-and-reverse brake 114 under the first forward speed produced in the manual first forward drive range. During the first forward speed in the manual first forward drive range, therefore a driving torque can be transmitted backwardly from the ring gear 98 to the sun gear 96 through the planet pinions 102 in the second planetary gear assembly 86 and, for this reason, the engine brake can be obtained.

The following description is directed to the detail in construction of the high-and-reverse clutch 52 to which the present invention is directly applied.

Figure 2:
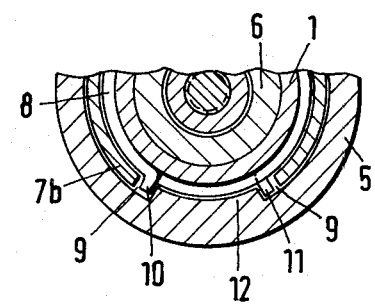
FIG. 2 is a fragmentary view, on an enlarged scale, of a portion of the transmission seen in FIG. 1, showing the detail of the clutch mechanism of the present invention.
Figure 3:
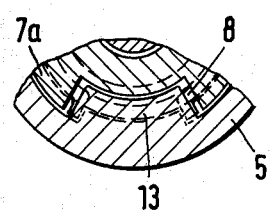
FIG. 3 is a fragmentary view taken in the direction of the arrow A shown in FIG. 2, several parts being not shown for clear showing of important portions.

Referring to FIGS. 2 and 3, especially FIG. 2, there is partially shown, but on an enlarged scale, the high-and-reverse clutch 52 and its incorporating parts. The clutch 52 comprises an outer drum member 200 of pressed sheet metal construction which is firmly mounted at its annular base portion 200a on a sleeve 202. The sleeve 202 is sealingly and rotatably disposed about the sleeve portion 140 of the oil pump body 46b so that the drum member 200 and the sleeve 202 are rotatable about the sleeve portion 140 as a single unit. The cylindrical outer wall portion 200b of the drum member 200 is formed with holes 204 through which a lubricant oil is forced to pass for lubrication between contact surfaces of the drum member 200 and the brake band 138 as will be apparent hereinafter. An inner drum member 206 having pressed sheet metal construction is concentrically disposed within the outer drum member 200 with its annular base portion 206a fixed as by welding to the inside surface of the annular base portion of the drum 200 by using electronbeam welding technique. (It should be noted that the drum member 200 and the drum member 206 constitute the before-mentioned "first clutch drum assembly 62".) The cylindrical inner side portion 206b of the inner drum member 206 has a small diameter section (no numeral) which defines the fluid chamber 80 for the piston 76, and a large diameter section (no numeral) which is wholly corrugated to have longitudinally extending grooves 208 therethroughout, as will be seen from FIG. 3. The clutch plates 60 hereinbefore-mentioned are splined to these grooves 208 to be movable longitudinally with respect to the inner drum member 206. Indicated by numeral 210 is a sealing member disposed between the piston 76 and the small diameter section of the inner drum member 206. The large diameter section of the inner drum member 206 is formed at its open end with a radially outwardly projected circular lip 212 which is entirely in contact with the inner surface of the cylindrical wall portion 200b of the outer drum member 200 so that an enclosed chamber 214 is defined between the drum members 200, 206 as shown. If desired, the lip 212 may be welded to the inner surface of the drum member 200 to provide complete oil-tight sealing therebetween. The corrugated cylindrical side portion 206b of the inner drum member 206 is formed with holes 216 at the positions facing the holes 204 of the drum member 200. Denoted by numeral 218 is a snap ring secured to the inner drum member 206 for limiting the rightward movements of the clutch plates 56 and 60.

Figure 4:
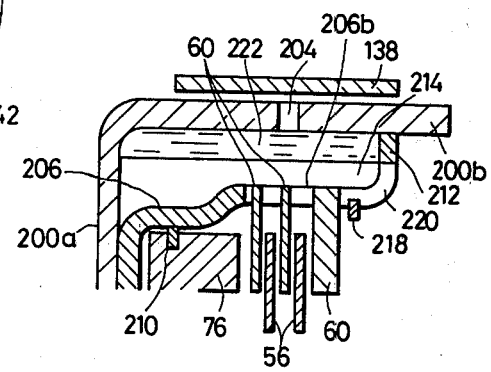
FIG. 4 is a fragmentary view, on an enlarged scale, of a clutch mechanism which is a modification of that shown in FIG. 2.

Referring to FIG. 4, a modification of the clutch drum assembly 62 is shown. In this modification, a plurality of longitudinally extending openings 220 are formed in the cylindrical side portion 206b of the inner drum member 206 as a substitute for the aforementioned grooves 208. Preferably, these openings 220 may be provided by punching or cutting machine. The clutch plates 60 are splined to these openings 220.

With the above-mentioned constructions of the high-and-reverse clutch 52, the following advantageous phenomenon will arise upon rotation of the clutch drum assembly 62.

The rotation of the clutch drum assembly 62 tends to force the lubricant oil in the space surrounding the clutch plates 56 and 60 to move radially outwardly by the centrifugal force thus exerted, so that the lubricant oil is forced to enter into the chamber 214 through the holes 216 (or the openings 220 in case of FIG. 4) with the result that the oil thus entered into the chamber 214 is pressed against the inner surface of the cylindrical wall portion 200b of the drum member 200 to make a pool 222 of the lubricant oil in a manner as is shown in FIG. 4. It should be noted that under rotation of the clutch drum assembly 62, the lubricant oil gathered in the chamber 214 has no exit except the openings 204. Thus, a sufficient amount of lubricant oil is fed through the holes 204 into a clearance defined by the contact surfaces of the brake band 138 and drum member 200 by the aid of the centrifugal force exerted therein upon rotation of the clutch drum assembly 62, so that optimum lubrication is achieved between the brake band 138 and the clutch drum assembly 62.

Figure 5:
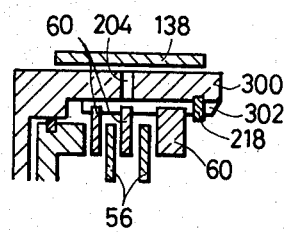
FIGS. 5 and 6 are fragmentary views similar to that of FIG. 4, but shows conventionally used clutch mechanisms.
Figure 6:
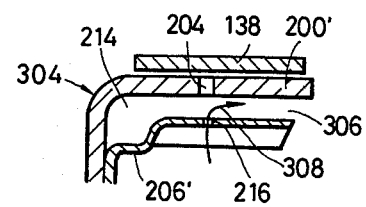

In order to make the advantages of the invention clear, two conventionally used clutch drum assemblies will be outlined with reference to FIGS. 5 and 6.

FIG. 5 shows a clutch drum 300 which is constructed of cast iron which is machined to have a plurality of longitudinally extending splines 302. However, light weight and low cost construction and good productivity are not expected from this type clutch drum as is known in the art.

The clutch drum assembly 304 of FIG. 6 has a similar construction to that of the invention and thus can solve the problems encountered in the cast iron type clutch drum 300 of FIG. 5. In the type of FIG. 6, however, effective oil distribution to the contact surfaces of the brake band 138 and the drum member 200' via the holes 204 is not expected even under rotation of the clutch drum assembly 304 because almost all the lubricant oil in the chamber 214 escapes through a clearance 306 defined between the rightward end of the inner drum member 206' and the outer drum member 200' in the direction of arrow 308.

What is claimed is:

1. A power transmission having input and output shafts, a clutch drum assembly, a brake band wrapping the clutch drum assembly to brake the same when actuated, first clutch plates splined at their outer peripheral edges to the clutch drum assembly, and second clutch plates splined to a hub member rotatable with the input shaft, with the first and second clutch plates being alternately arranged, said clutch drum assembly comprising:

an outer drum member having an annular base portion and a cylindrical outer wall portion, said outer wall portion having an exterior surface contacted by said brake band, said outer drum member being coaxial with and rotatable about the axis of said input shaft;

an inner drum member having a cylindrical inner wall portion with an annular base portion at one end thereof which is fixed to and in sealing contact with the annular base portion of said outer drum member, said cylindrical inner wall portion being radially spaced from and being concentrically arranged within said cylindrical outer wall portion, said cylindrical inner wall portion being formed with a plurality of axially extending spline portions to which said first clutch plates are splined, the opposite end of said cylindrical inner wall portion being shaped to provide a radially outwardly extending integral lip in sealing contact with said cylindrical outer wall portion, the radial spacing between said cylindrical inner and outer wall portions in combination with the sealing contact between said annular base portions as well as between said lip and said cylindrical outer wall portion cooperating to define a fluid retaining chamber between said inner and outer drum members; and means for providing a fluid communication between the interior of said inner drum member and said fluid retaining chamber, and between said fluid retaining chamber and the exterior surface of said outer wall portion.

2. A power transmission as claimed in claim 1 wherein said means comprise radially aligned openings in said inner and outer cylindrical wall portions.

3. A power transmission was claimed in claim 2 wherein the openings in said inner cylindrical wall portion extend longitudinally and provide said spline portions for said first clutch plates.

4. A power transmission as claimed in claim 1 wherein said inner and outer drum members are integrally formed as sheet metal stampings.

5. In a power transmission, a clutch drum assembly comprising:

an outer drum member having an annular base portion and a cylindrical outer wall portion, said outer wall portion having an exterior surface;

an inner drum member formed, by pressing, from a sheet of metal, said inner drum member having a cylindrical inner wall portion which is fixed at one end thereof in sealing contact the annular base portion of said outer drum member, said cylindrical inner wall portion being radially spaced from and being concentrically arranged within said outer wall portion, said cylindrical inner wall portion being formed with a plurality of axially extending spline portions, the opposite end of said cylindrical inner wall portion being shaped to extend radially outwardly into sealing contact with said cylindrical outer wall portion, the radial spacing between said cylindrical inner and outer wall portions in combination with the sealing contact between the opposite ends of said inner drum and the annular base portion and cylindrical outer wall portion of said outer drum cooperating to define a fluid retaining chamber between said inner and outer drum members; and means for providing a fluid communication between the interior of said inner drum member and said fluid retaining chamber, and between said fluid retaining chamber and the exterior surface of said outer wall portion.

* * * * *